No. 659,326.  
DE WANE B. SMITH.  
SWIVEL FOR HOSE.  
(Application filed July 14, 1900.)  
Patented Oct. 9, 1900.

(No Model.)

WITNESSES.  
Rich. A. George.  
Vernon W. Lee.

INVENTOR  
DE WANE B. SMITH.  
By Milton E. Robinson  
ATTORNEY.

UNITED STATES PATENT OFFICE.

DE WANE B. SMITH, OF DEERFIELD, NEW YORK.

SWIVEL FOR HOSE.

SPECIFICATION forming part of Letters Patent No. 659,326, dated October 9, 1900.

Application filed July 14, 1900. Serial No. 23,590. (No model.)

*To all whom it may concern:*

Be it known that I, DE WANE B. SMITH, of Deerfield, in the county of Oneida and State of New York, have invented certain new and useful Improvements in Swivels for Hose; and I do hereby declare that the following is a full, clear, and exact description thereof, which will enable others skilled in the art to which it appertains to make and use the same, reference being had to the accompanying drawings, and to the numerals of reference marked thereon, which form part of this specification.

The object of my present invention is to provide a hose-swivel, particularly for use with bicycle and similar pumps, which is free-running and air-tight.

Figure 1:
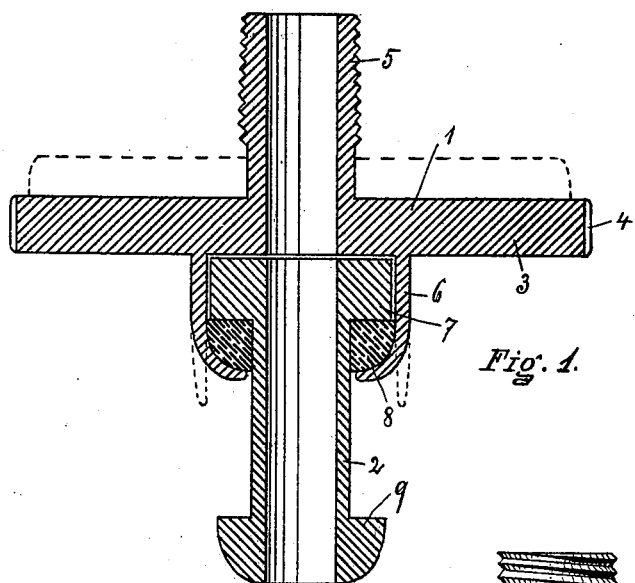
Figure 2:
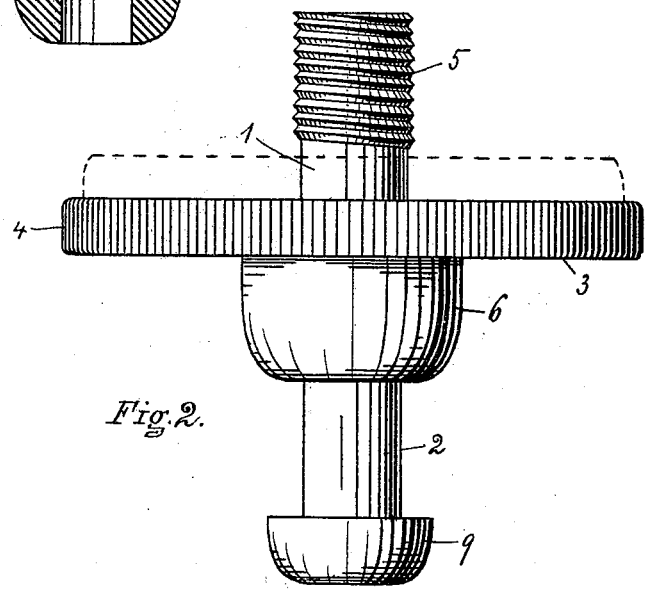

Figure 1 shows a longitudinal section of my improved swivel. Fig. 2 shows a side elevation of the same.

The swivel consists of two main parts 1 and 2, the latter adapted to be attached to the hose and the former to a fitting, as of a pneumatic bicycle-tire. The part 1 consists of an enlarged disk 3, preferably having a milled edge, as shown at 4, whereby the part may be rotated by the hand of the operator. The part 1 also includes a screw-threaded pipe-like portion 5, adapted to be screw-threaded into the pneumatic-tire fitting. The part 1 is also provided with a socket formed by the circular wall 6. This socket receives the head 7 of the hose part 2. In the manufacture the wall 6 is first formed in the position shown in dotted lines in Fig. 1, allowing the head 7 of the hose part to be inserted in the socket. Following the head 7 is a packing-ring 8, of elastic or yielding material, preferably leather. The projecting edge of the wall 6 is "spun" down onto the packing 8, forming the construction as shown. In spinning down the edge of the wall 6 the inner surface engaging with the packing 8 is more or less rough and takes such a hold of the packing 8 that when the two parts of the swivel are turned with reference to each other the packing 8 revolves with the part 1. The part 2 is preferably provided with a shoulder 9, over which the end of the hose can be slipped and secured with a wire or other clamping or binding device, so as to maintain its position on the part 2.

It will be noted that, as shown in the drawings, the head 7 of the hose part is not in actual contact with any wall or part of the part 1. This may indicate a swivel which is somewhat worn, but is still for all practical purposes air-tight, for the reason that when the pressure of air within the swivel operates it tends to blow the two parts 1 and 2 apart and compress the packing and make the joint air-tight. At the same time the parts are very free to swivel or turn with reference to each other, particularly when there is no pressure in the swivel, which is the case when it is being attached or detached.

What I claim as new, and desire to secure by Letters Patent, is—

The combination in a swivel of the part adapted to be attached to the fitting, having a socket with inwardly-turned end or shoulder, a part adapted to be attached to the hose having a head received in said socket and a packing interposed between the said inwardly-turned end or shoulder of the socket and said head, substantially as set forth.

In witness whereof I have affixed my signature, in presence of two witnesses, this 11th day of July, 1900.

DE WANE B. SMITH.

Witnesses:
E. WILLARD JONES,
SARAH A. BROWN.